United States Patent Office 2,704,150
Patented Mar. 15, 1955

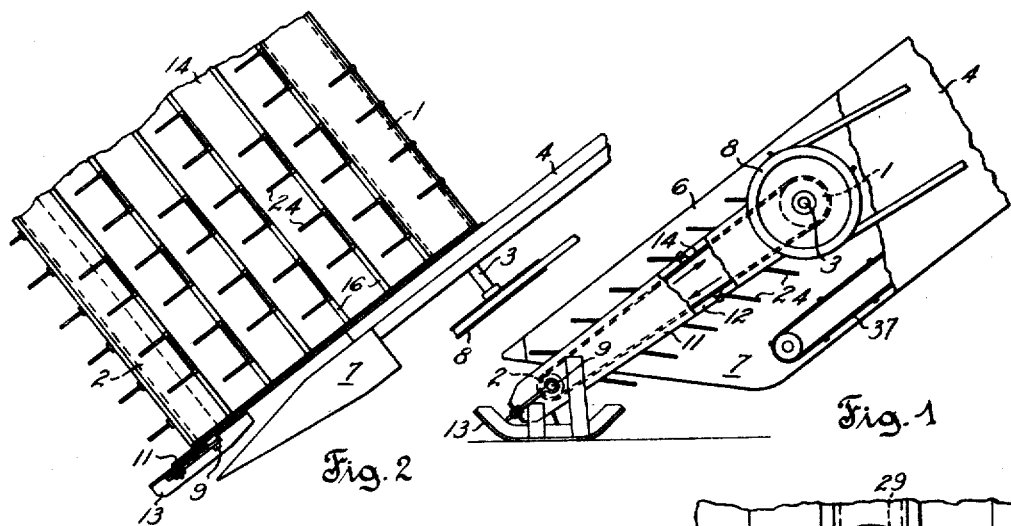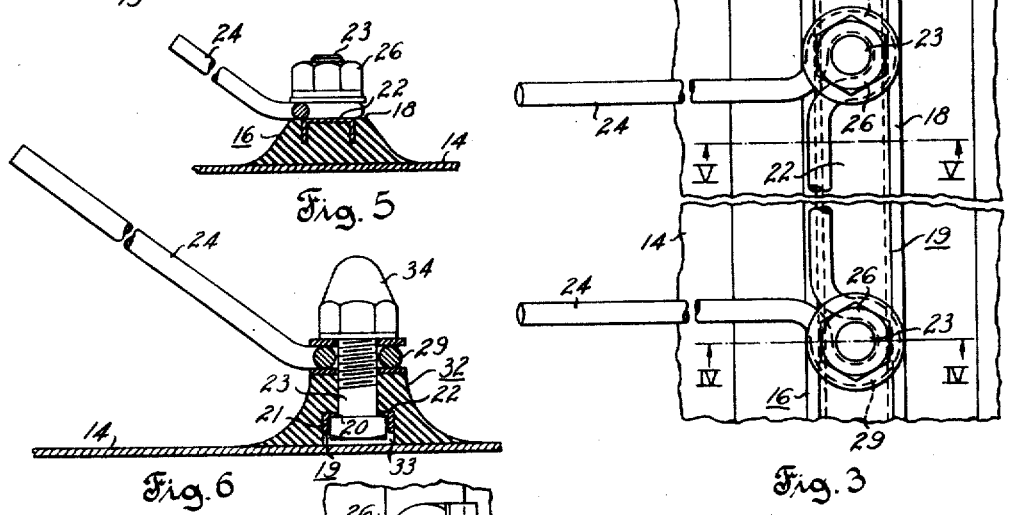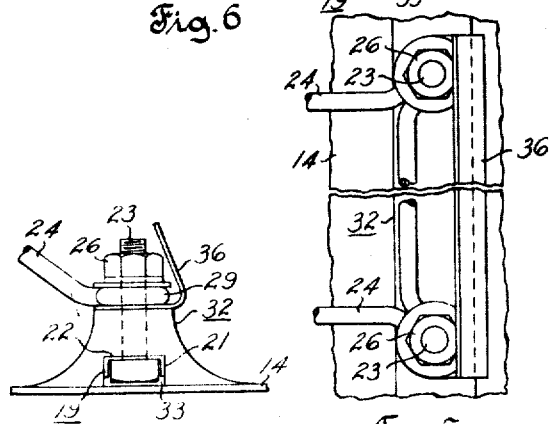

2,704,150

DRAPER TYPE PICKUP

Charles J. Scranton, La Porte, Ind., assignor to Allis-Chalmers Manufacturing Company, Milwaukee, Wis.

Application December 13, 1950, Serial No. 200,540

14 Claims. (Cl. 198—197)

This invention relates to an improvement in the construction of pickup devices, and more particularly to those used on farm machinery, such as harvesters and the like.

An object of this invention is to provide an endless belt of a pickup device with a slat which is relatively rigid at its outer portion but flexible at its attachment with the endless belt.

A further object of this invention is to provide a reinforcing member for a flexible slat on a pickup device wherein such reinforcing member provides means for attaching pickup fingers thereto.

Another object of this invention is to provide a pickup device with reinforced slats having sufficient flexibility to pass around small rollers without destructive effect.

Another object of this invention is to provide a pickup device that will efficiently pick up material without the material becoming entangled in the device.

It is a further object of this invention to provide means for fastening slats and pickup fingers to a belt without injuring or reducing the strength of the belt.

Another object of this invention is to provide a durable pickup device which will operate quietly.

Another object of this invention is to provide resilient means for attaching pickup fingers to a conveyer belt.

These and other objects will be more fully explained as this description progresses.

Now referring to the accompanying drawings:

Fig. 1 is a side elevation of a pickup device as applied to the header of a harvesting machine;

Fig. 2 is a fragmentary plan view of the draper conveyer of Fig. 1;

Fig. 3 is an enlarged fragmentary plan view of a pickup finger attached to a slat;

Fig. 4 is a section view taken on line IV—IV of Fig. 3 showing the construction of the conveyer slat and pickup finger mounting;

Fig. 5 is a section view taken on line V—V of Fig. 3;

Fig. 6 is a section view similar to Fig. 4 of a modified type of slat;

Fig. 7 is a fragmentary plan view of fastening means for retaining the pickup finger to the slat including a guard member; and Fig. 8 is an end view in elevation of Fig. 7.

Referring to the drawings, an embodiment of the invention is shown in Figs. 1 and 2 in the form of a pickup device attached to the forward end of a harvester header and includes upper and lower rolls 1 and 2, respectively. Upper roll 1 is attached to shaft 3 for rotation therewith, shaft 3 being journaled in sidewalls 4 and 6 of header 7. A pulley 8 is attached to the end of shaft 3 and this pulley is driven by conventional means (not shown) from the harvesting mechanism. The pickup device also includes a shaft 9 about which lower roll 2 is attached for rotation therewith. Side members 11 and 12 are relatively rotatably connected at their upper ends to shaft 3 and at their lower ends provide bearings for rotatably supporting shaft 9. Also connected to the lower ends of side members 11 and 12 are shoe members 13 which ride on the ground during normal operation of the pickup device. Counterbalancing means (not shown) can be provided which supports most of the weight of the forward end of the pickup device thereby permitting the forward end of the pickup device to raise and lower readily in following the contour of the ground.

An endless belt 14 encircles rolls 1 and 2. Belt 14 may be of fabric, rubber or fabric impregnated with rubber or similar plastic material. In the embodiment shown for purposes of illustration in Figs. 3 and 4, belt 14 is a canvas material impregnated with rubber. At longitudinally spaced intervals on belt 14, transversely extending slats 16 which extend the width of the belt are vulcanized thereto. Referring to Fig. 4, it is seen that the slats are made of rubber vulcanized to belt 14, however, these slats can be made of any like plastic material, and each slat 16 has curved transversely extending sides 17 feathering down to the point of vulcanized attachment with belt 14, and an outstanding surface 18 extending generally parallel to belt 14. A channel member 19 is vulcanized to slat 16 with the flange portions 21 extending toward belt 14 in spaced relation thereto and with the outer surface of web 22 lying in the plane of surface 18 (see Fig. 5). At transversely spaced intervals on web 22, holes 20 are provided through which the shanks of bolts 23 extend. The heads of bolts 23 are nonrotatably retained between the flanges 21 of channel 19 and the inner surface of web 22.

Pickup fingers 24 are attached to the channels 19 by means of bolts 23 and nuts 26 with washer 27 and lock washer 28 interposed between the fastening portion 29 of pickup finger 24 and nut 26. The pickup fingers 24 as shown in Fig. 3 are preferably made of one piece of spring wire fabricated into two pickup fingers each provided with a fastening portion 29 for attaching same to slats 16 as already described.

Referring to Fig. 6 a modified type of slat structure is shown in which slats 32 extending the width of the belt 14 are vulcanized thereto. Each slat 32 has a generally inverted U-shaped or channel-like cross section with the ends of the U vulcanized to the belt 14 and thus providing a transversely extending aperture or duct 33 between each slat and the belt. A channel member 19, constructed of metal or the like, is vulcanized to each slat within this aperture 33. This channel member acts as a stiffener therefor and also provides seats for the heads of bolts 23 which are positioned at transversely spaced intervals along slats 32 with the shank portions of the bolts extending through holes 20 in the web 22 of channel members 19 and through the outer portions of the slats, the diameter of hole 20 being less than the effective diameter of the head of bolt 23. The heads of bolts 23 are nonrotatably received between flanges 21 of channel 19 in the manner previously described for the embodiment shown in Fig. 4. An acorn nut 34 is used for retaining pickup fingers 24 on slat 32. Any type of nut may be used but this acorn type eliminates some points of contact upon which material may become entangled.

The modification as shown in Fig. 6 will provide a greater degree of flexibility between slat and belt than the embodiment shown in Fig. 4 and depending upon the degree of flexibility desired in the slat either embodiment can be used.

Figs. 7 and 8 show an attaching means and shield therefor. In Fig. 8, it is seen that a conventional nut 26 has been substituted for the acorn nut of Fig. 6 and a guard element 36 is fastened to the slats 32 beneath the attaching portions 29 of the pickup fingers. This guard element curves up and over the upper portion of nuts 26 and extends transversely a sufficient distance to cover the fastening portions of two pickup fingers as is shown in Fig. 7. As this guard element 36 is located at the leading edge of the slat, it prevents harvested material from becoming tangled with nut 26 and with the fastening portions of pickup fingers 24.

The operation of the pickup device is as follows: As the harvester moves through the field with the pickup device on its header 7 driven so that the lower run of the belt is moving forwardly as indicated by arrows in Fig. 1 the pickup fingers 24 as they move about lower roll 2 just miss the ground and in so doing contact the crop lying on the ground, raising same onto the upper run of belt 14 which is traveling rearwardly. The crop is then conveyed to the rear end of the pickup device where it is deposited on conveyor 37 of the harvester which conveyor moves the crop material rearwardly and upwardly to the harvester.

It is, therefore, apparent that a pickup device embodying this invention provides a quiet running mechanism having easily attachable and detachable pickup fingers and provides slats of reinforced yet flexible construction.

Some of the characterizing features of the present invention are applicable to the construction of apparatus different from that disclosed herein for purposes of illustration, and, therefore, it is to be understood that it is not desired to limit the invention to the particular features and details described hereinabove and that the invention is to be considered as including such other forms and modifications as are fairly within the scope of the appended claims.

It is claimed and desired to secure by Letters Patent:

1. In combination with a length of material having its opposite ends unitable to form a longitudinally extending endless conveyer belt having at least one transversely extending flexible slat vulcanized thereto, the improvement comprising a channel member vulcanized to said slat and so positioned that the flanges of said channel member extend toward said belt and one of the web surfaces thereof lies in the same plane as the outstanding surface of said slat, and means for mounting pickup fingers on said one of the web surfaces.

2. In combination in a pickup device including a longitudinally extending conveyer belt having at least one transversely extending slat vulcanized thereto, the improvement comprising a channel member vulcanized to said slat and being substantially coextensive therewith, said channel member being positioned with the flange portions thereof extending toward said belt in spaced relation thereto and with the web portion extending substantially parallel to said belt, said channel member being positioned so that one web surface thereof lies in the same plane as portions of said slat extending the greatest distance from said belt, said web portion having transversely spaced holes therein, and means included in said slat by said channel for retaining pickup fingers on said slat.

3. In combination in a pickup device adapted to be attached to a harvester, said pickup device including upper and lower rolls, an endless belt trained about said rolls, said belt having slats vulcanized thereto, the improvement comprising a reinforcing member vulcanized within each of said slats and being substantially coextensive therewith, fastening members retained within said reinforcing members and having portions extending therefrom, and pickup fingers attached to the extending portions of said fastening members.

4. In combination in a pickup device including upper and lower rolls, an endless belt trained about said rolls for longitudinal movement, said belt having rubber slats vulcanized thereto, the improvement comprising a channel member received within each of said slats and being substantially coextensive therewith, said channel members being spaced from said belt, each of said channel members providing a series of transversely spaced holes extending through the web of said channel, fastening means snugly positioned between the flanges of said channel, adjacent the web thereof and spaced from said belt, said means including elements extending through the holes for retaining pickup fingers on said slat.

5. In combination in a pickup device adapted to be attached to a harvester, said pickup device including upper and lower rolls, an endless belt trained about said rolls for longitudinal movement, said belt having a plurality of longitudinally spaced, transversely extending rubber slats vulcanized thereto, said slats extending the width of said pickup device, the improvement comprising a channel member received within each of said slats and being coextensive therewith, each of said channel members having its web portion extending parallel to said belt and having its flange portions extending toward said belt, said flange portions being positioned in spaced relation to said belt, each of said channel members having transversely spaced holes in the web portion thereof, bolts having their head portions snugly received between said flange portions in spaced relation to said belt and having their shank portions extending through the holes in said web portion, pickup fingers having attaching portions adapted to receive said shank portions, and fastening means coacting with the shank ends of said bolts for retaining said fingers on said slats.

6. In combination in a pickup device adapted to be attached to a harvester, said pickup device including upper and lower rolls, an endless belt trained about said rolls for longitudinal movement, said belt having a plurality of longitudinally spaced rubber slats vulcanized thereto in transverse relation to the direction of travel thereof, said slats extending substantially the width of said pickup device, the improvement comprising a channel member vulcanized within each of said slats and being substantially coextensive therewith, each of said channel members having its web portion extending parallel to said belt and having its flange portions extending toward said belt, each of said channel members having spaced holes in the web portion, and bolts having their head portion snugly received between said flanges and having their shank portions extending through the holes in said web portion, pickup fingers having attaching portions adapted to receive said shank portions, and fastening means coacting with the shank portions of said bolts to retain said fingers positioned on said slats.

7. In combination in a pickup device adapted to be attached to a harvester, said pickup device including upper and lower rolls, an endless belt trained about said rolls for longitudinal movement and having at least one transversely extending rubber slat vulcanized to and projecting from one side of said conveyor belt, said slat extending the width of said pickup device, the improvement comprising said rubber slat presenting a generally inverted U-shaped cross section with the surfaces at the ends of the U vulcanized to said belt and thereby providing a transversely extending aperture formed between said belt and said slat, a channel shaped stiffening member positioned in the aperture between said belt and said slat in spaced relation to said belt and being coextensive in length with said slat, said stiffening member being vulcanized to said slat and having a series of transversely spaced holes in the web thereof in alignment with similar holes in said slat, attaching means positioned in the aperture and extending through the holes in said slat and channel, and retaining means connectable with said attaching means for retaining pickup fingers on said slat.

8. In combination in a pickup device adapted to be attached to a harvester, said pickup device including upper and lower rolls, an endless belt trained about said rolls for longitudinal movement, and a plurality of longitudinally spaced transversely extending rubber slats vulcanized to and projecting from one side of said belt, the improvement comprising said rubber slats each having a generally inverted U-shaped cross section with the surfaces at the ends of the U vulcanized to said belt and thereby providing a transversely extending aperture between said belt and each of said slats, each of said slats having a channel shaped stiffening member positioned within said transversely extending aperture thereof, said stiffening members being positioned in spaced relation to said belt and being coextensive in length with and vulcanized to said slats, each of said stiffening members having its flange portions extending toward said belt and having a series of transversely spaced holes in the web thereof in alignment with holes in its encompassing slat, bolts having head portions of a size larger than said holes and of a size to fit snugly between the flanges of said channels with the shank portions of said bolts extending through the holes in said channel and said slat, and means coacting with the shank portions of said bolts for retaining pickup fingers on said slats.

9. In combination in a pickup device adapted to be attached to a harvester, said pickup device including upper and lower rolls, an endless belt trained about said rolls for longitudinal movement and having at least one transversely extending rubber slat vulcanized to and projecting from one side of said belt, said slat extending the width of said pickup device, the improvement comprising said rubber slat presenting a generally inverted U-shaped cross section with the surfaces at the ends of the U vulcanized to said belt and thereby providing an aperture extending transversely to the direction of travel of said belt, a metal channel member positioned within said transversely extending aperture in spaced relation to said belt and being coextensive in length with said slat and being vulcanized to said slat, said channel member having a series of transversely spaced holes in the web thereof in alignment with similar holes in said slat, attaching means positioned in the aperture and extending through the holes in said slat and channel, retaining means connectable with said attaching means for retaining pickup fingers on said slat, and a shield attached to said slat beneath said retaining means and extending upwardly past the leading portions of said fastening means and said fingers and over same.

10. In combination with a length of flexible material having its opposite ends unitable to form an endless conveyer belt and having at least one transversely extending flexible slat secured to and projecting from one side of said material, the improvement comprising a rigid channel member coextensive in length with said slat and secured thereto in a position in which the web of said channel member extends substantially parallel to said belt material at a distance from the latter substantially equal to the height of said slat, and in which position the flanges of said channel member extend from said web toward said flexible material and are embedded in said slat, said web having a series of openings therethrough spaced from each other in the longitudinal direction of said channel member for passing tine fastening means through said web, and said slat being recessed in registry with said openings for accommodating portions of said tine fastening means within said slat.

11. In combination in a pickup device adapted to be attached to a harvester, said pickup device including upper and lower rolls, an endless belt trained about said rolls, said belt having a series of transversely extending rubber slats vulcanized to and projecting from one side thereof, the improvement comprising a series of rigid channel members embedded within and vulcanized, respectively, to inner portions of said slats at said one side of said conveyer belt, said channel members being coextensive in length with their respective slats and each having a series of spaced holes extending through its web, pickup finger fastening means positioned between the flanges of each of said channel member and adjacent the web thereof, and means coacting with said fastening means through said holes for retaining pickup fingers on said slats.

12. In combination with a length of flexible material having its opposite ends unitable to form an endless conveyer belt and having at least one transversely extending flexible slat vulcanized to and projecting from one side of said material, the improvement comprising a stiffener member embedded within and vulcanized to said slat and being coextensive in length with the latter, said stiffener member having a series of openings therethrough spaced from each other in the longitudinal direction of said slat for passing tine fastening means through said openings, and said slat being apertured in registry with said openings for accommodating portions of said tine fastening means within said slat.

13. In combination with a length of flexible material having its opposite ends unitable to form an endless conveyer belt and having at least one transversely extending flexible slat secured to said material, the improvement comprising a rigid channel member extending lengthwise of and secured to said slat in a position in which the inner web surface of said channel member faces toward said flexible material and at least the flanges of said channel member are embedded in said slat, the web of said channel member having a series of openings therethrough spaced from each other in the longitudinal direction of said channel member for passing tine fastening means through said openings and said slat being apertured in registry with said openings for accommodating portions of said tine fastening means within said slat.

14. In combination with a length of flexible material having its opposite ends unitable to form an endless conveyer belt, the improvement comprising a series of flexible slats channel shaped in cross section and abuttingly secured, at their flange edges, to said material so that said slats project from one side of said belt in transversely extending relation to the latter and in spaced relation to each other, said slats being coextensive in length with the width of said belt and coacting with said flexible material to form a series of transversely extending ducts at said one side of the belt, and a series of rigid channel members extending lengthwise, respectively, within said ducts and being coextensive in length with said slats, each of said channel members being secured to its respective slat in a position in which its web is spaced from and its flanges extend toward said flexible material; each of said channels having a series of openings extending through and spaced from each other in the longitudinal direction of its web, and each of said slats having a series of openings in registry, respectively, with said web openings, so as to afford passages for tine fastening means extending through said slats and channel members.

References Cited in the file of this patent

UNITED STATES PATENTS

| 417,065 | Miller | Dec. 10, 1889 |
| 1,779,720 | Wood | Oct. 28, 1930 |
| 2,305,044 | Toews | Dec. 15, 1942 |
| 2,351,144 | Oehler | June 13, 1944 |

FOREIGN PATENTS

| 21,137 of 1907 | Great Britain | July 30, 1908 |
| 519,079 | Great Britain | Mar. 15, 1940 |